United States Patent [19]

Bellanca

[11] 3,940,503

[45] Feb. 24, 1976

[54] COLORING PROCESS AND COLORED ARTICLES

[75] Inventor: Nicolo Bellanca, San Jose, Calif.

[73] Assignee: Dynapol, Palo Alto, Calif.

[22] Filed: Apr. 1, 1974

[21] Appl. No.: 456,669

[52] U.S. Cl. ............................... 426/540; 426/573
[51] Int. Cl.² ..................................... A23L 1/275
[58] Field of Search ............ 426/177, 250, 167–170, 426/350, 540

[56] References Cited
UNITED STATES PATENTS

| | | | |
|---|---|---|---|
| 3,734,745 | 5/1973 | Cassanelli et al. ................... | 426/168 |
| 3,763,086 | 10/1973 | Kalopissis et al. ................. | 260/41 C |
| 3,797,994 | 3/1974 | Kalopissis ............................ | 8/10.1 |

*Primary Examiner*—Jeanette M. Hunter
*Attorney, Agent, or Firm*—William H. Benz

[57] ABSTRACT

Translucent substrates such as foodstuffs are colored by adding polymeric dyes. The dyes contain from 0.1 to 2.0 parts of nonchromophoric material for each part by weight of chromophore and are added in a weight amount equivalent to from 0.4 to 0.9 times the weight of monomeric chromophore required to give the equivalent visual shade.

7 Claims, No Drawings

COLORING PROCESS AND COLORED ARTICLES

BACKGROUND OF THE INVENTION

1. Field of the Invention

This invention relates to artificially-colored, translucent substrates and a process for their manufacture. In a preferred embodiment, the substrates are foodstuffs.

2. The Prior Art

It is difficult to think of a product which does not contain artificial coloring or dyes. Most commonly, these colorings or dyes are monomeric chromophoric chemical species. There has been, however, substantial effort devoted to dyes and colorings which are polymeric. These materials have found application in textile dyeing, as evidenced by U.S. Pat. No. 3,232,691, granted Feb. 1, 1966 to Wilhelm et al; photography, as evidenced by U.S. Pat. No. 3,073,699, granted Jan. 15, 1963 to Firestine; dyeing of cellulose derivatives, as evidenced by U.S. Pat. No. 2,371,052, granted Mar. 6, 1945 to Kirby; and in coloring foods, as evidenced by the article "Studies on Polymeric Dyes I, Macromolecularization of Food Dyes" by Ida et al, appearing at pages 517–523 of Volume 89 (1969) of Yakugaku Zasshi.

Polymeric dyes and colors do not contain pure chromophore. Instead, they additionally contain nonchromophoric units, chemical groups and/or molecular segments which function to bind the chromophoric groups into a polymeric form. It is therefore quite understandable that, on a pound for pound basis, in most applications polymeric dyes are somewhat less potent colorants than monomeric dyes.

Statement of the Invention

While studying polymeric dyes and their applications, I made a most suprising discovery. When polymeric dyes are employed as colorants for translucent substrates, they exhibit a greater color potency, on a pound for pound basis, than do monomeric dyes.

In general terms, this means that to achieve a desired color shade in a translucent substrate, the weight of the polymeric dye needed would be less than the weight of the corresponding monomeric dye. This is true even though the polymeric dye contains substantial amounts of nonchromophoric material binding its chromophores together.

There are, of course, limitations to this discovery. It does not hold true for polymeric dyes which contain only very small amounts of chromophore and very large amounts of nonchromophore, such as more than about two parts by weight nonchromophore for each part by weight chromophore.

This invention, stated in more precise terms, involves colored products made up of a transparent substrate having admixed therewith a polymeric dye. The dye contains chromophoric groups and, to join the chromophoric groups into a polymer, nonchromophoric groups. The weight ratio of these groups ranges from about 1 part chromophore to 0.1 part nonchromophore. The weight of this polymeric dye which must be added to achieve a desired shade is but from 0.4 to 0.9 times the weight of monomeric dye needed to achieve that shade.

DETAILED DESCRIPTION OF THE INVENTION

Substrates

The substrates to which this invention applies are translucent substrates. "Translucent" is used herein in its classical sense; that is, it describes materials which trasmit light pellucidly or diffusively. Preferably, the substrate is transparent; that is, it transmits light pellucidly.

In a preferred embodiment, the substrates are three-dimensional. "Three-dimensional" as used herein, defines that the substrate, in addition to having a length and width, has a thickness which is relatively substantial. More preferably, the substrates are sized so that their thickness is not less than 1/20th the average of their length and width. Most preferably, none of the three dimensions is substantially less than 0.1 inches.

Suitable substrates may be solids, gels or liquids, preferably stored in translucent containers which permit assumption of a three-dimensional geometry. Suitable substrates include translucent plastics and polymers, silicone oils, gasoline and other liquid hydrocarbons. A preferred class of substrates is made up of translucent edible materials such as beverages; for example, soft drinks, typically clear cherry soda, and clear and light diffusing orange sodas; beer, wine and distilled spirits, jellies, jelled desserts, hard rock candies, cough syrups and drops and other pharmaceutical elixers and the like.

The Dyes

Polymeric dyes give the effect of this invention. A polymeric dye contains two parts: a chromophore part, indicatable by Ch, which supplies the color; and a nonchromophore part (B) which joins the chromophores into a polymer. These dyes may assume the structure $+ChB+_n$ or the structure

wherein $n$ is an integer greater than 1, such as from 2 to 4,000, especially 10 to 3,000. Although the average molecular weights which correspond to these values of $n$ of course depend upon the size of B and Ch, it is generally preferred to employ polymeric dyes of molecular weight 1,000 to 1,000,000 so long as they do contain a plurality of chromophores. A monomeric dye meeting this molecular size should not yield the effect of this invention. A preferred molecular weight range is from 2,000 to 400,000.

While it is not my wish to limit my invention to any particular chromophore, Ch, or nonchromophore, B, there are restraints on these components. In the overall molecule, for each part by weight of Ch, there can be from 0.1 to 2 parts of B. If the amount of B is lowered below 0.1 parts, there are problems with color predictability and reproductability—possibly, though not known for certain—due to steric interactions between too-proximate chromophores. If the amount of B is raised above about 2 parts, the extra color property of this invention is not observed—apparently because the B's diluent effect overrides it. Especially good results are obtained when for each part by weight of Ch there is from 0.2 to 1.5 parts of B.

The chromophores employed, Ch, are organic materials. Inorganic colors, such as the ferricyanides and the like are not suitable. Due to their polymeric nature, the final products can be made so large that they cannot be absorbed out of the gastrointestinal tract into the blood stream, and thus be totally nontoxic. This desirable property is achieved when molecular weights are 2,000 or 5,000 or larger. Thus, it is possible in the preferred food applications to incorporate chromophores which previously were not usable in foods because of toxicity.

Exemplary chromophores include known azo dyes such as CI Acid Yellow No. 36

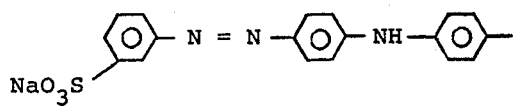

CI Mordant Orange No. I

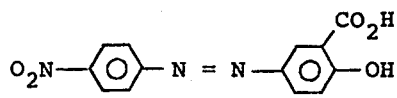

FD&C Yellow No. 6

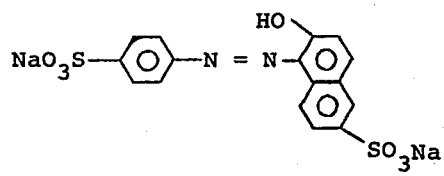

FC&C Yellow No. 5

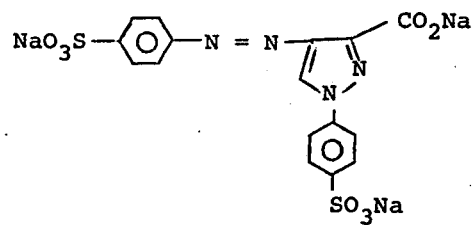

FD&C Red No. 2

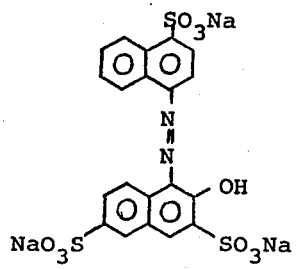

and FD&C Red No. 40

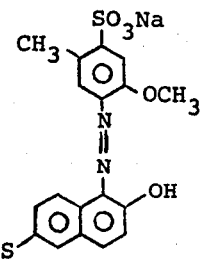

indigoid dyes such as

CI Vat Blue No. 1

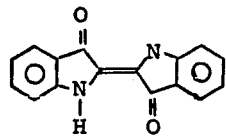

and

FD Vat Blue No. 2

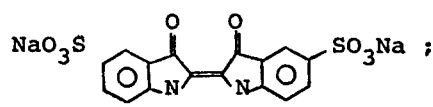

and triphenylmethane dyes such as FD&C Green No. 3

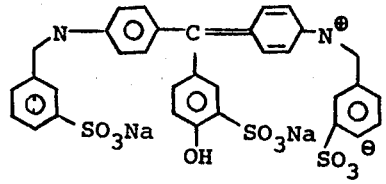

CI Basic Violet No. 1

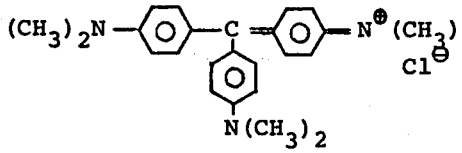

FD&C Violet No. 1

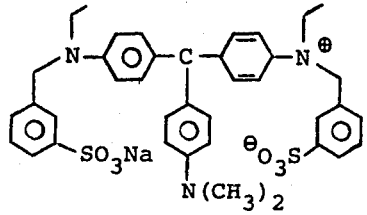

and
CI Basic Green No. 4

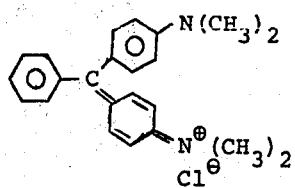

and hetercyclic dyes such as CI Basic Blue No. 9

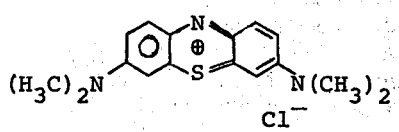

and Uranine

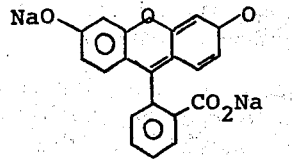

This list is intended merely to be illustrative and is not to be construed as limiting the specific chromophores or even classes of chromophores which can be employed.

The Linking Groups, B

The chromophores are linked into polymers via linking groups, B. The B groups are organic. They provide a plurality of active groups which attach to a plurality of chromophores; or, if the chromophores are so-called "reactive chromophores", having their own reactive groups, they can merely provide active cites to which the chromophores can attach.

Examples of the first type of B include simple links providing two active groups, such as the two olefinic groups in divinylbenzene or 1,4-butadiene; the two hydroxyl groups ethylene glycol, or hydroquinone, or more complex links providing a large number of active groups, such as poly(1,2-butadiene), polyacrylic acid, polyethyleneimine (both linear and branched), poly-2 or 4-vinylpiperidine, polybuteneamine, polyvinylalcohol, polyvinyl-(3-aminopropyl)-ether, cyclopolydiallylamine, poly-2-aminoethylmethacrylate, polyvinyl(2-aminoethyl)-ether, polyacrolein, poly-2-amino-1-vinylethanol, and polyepichlorohydrin.

Examples of the second type of B include cellulose, polyethers, hydrocarbons, and the like.

The linking groups may also include nonchromophoric groups which modify the polymer's properties; for example, its solubility in water or oil.

These polymeric dyes can be made by methods known in the art. As this invention involves an application of these dyes rather than the dyes per se, a detailed description of the production will not be provided. The Examples contain a variety of representative preparations, however.

Coloring Substrates

Translucent substrates are colored by adding thereto a polymeric dye. In accordance with this invention, the amount of dye required is less than is required with monomeric dyes. So long as the polymeric dyes have the chromophore proportions specified, the amout of polymeric dyes required will range from 0.4 to 0.9 times the amount of monomeric dye required to yield the same shade. Thus, from 0.4 to 0.9 pounds of polymeric dye will color a translucent substrate to the same shade as will 1.0 pounds of monomeric dye. As a rule of thumb, those polymeric dyes containing relatively larger proportions of nonchromophoric material, such as one part per part of chromophore, will show less advantage than those polymeric dyes containing smaller proportions of nonchromophoric material.

The polymeric dyes will be added to the substrates by conventional techniques. No special precautions or efforts need be taken.

The invention will be further described by the following Examples. These are intended to be illustrative and not to limit the scope of the invention as defined by the appended claims.

EXAMPLE I

A. A 15 g portion of polyacrylic acid is dissolved in 75 ml of concentrated sulfuric acid with stirring at room temperature for 40 minutes. The polyacrylic acid solution is then stirred at 40°C while 140 ml of 2.15 M hydrazoic acid ($HN_3$) in benzene is added dropwise with stirring over a period of 4.5 hours. The reaction, a Schmidt rearrangement, is continued at 40°C for about 14 hours. The mixture is then stripped of benzene to give an almost clear yellow solution, which is cooled to 5°C. Methanol (150 ml) is then added. The resulting emulsion is centrifuged at high speed for 30 minutes to separate the precipitate. The precipitate is dissolved in 50 ml of water and gives a yellow solution. This solution is precipitated by addition to methanol, the precipitate being once again dissolved and precipitated a third time for purification. 12.06 Grams of a white solid are recovered. Elemental analysis shows this product to be a copolymer of acrylic acid (mole ratio 0.46) and vinylamine (mole ratio 0.54).

B. 10 Grams of the product of Part A are dissolved in 35 ml of water. An 11% solution of sodium hydroxide is then dripped in to pH of 9. 28.5 Grams of N-acetylsulfanilyl chloride is added in small portions over a period of 5.5 hours. The pH of the solution is increased throughout the addition in order to keep the polymer in solution, gradually increasing from an initial pH of about 9 to a final pH of about 12.5. After completing the addition of N-acetylsulfanilyl chloride, conditions are maintained constant for 1 hour and then the cloudy yellow solution which results is filtered. The resulting clear yellow solution is dripped into a stirred 25% solution of acetic acid to give a white precipitate, which is collected, rinsed with water, and dried in vacuo to give 20.8 g of a white powder.

18.7 Grams of the white powder is suspended in 75 ml of 10% aqueous hydrochloric acid, and this mixture is heated at reflux with stirring under argon for 1 hour (to hydrolyze the N-acetyl group). A clear yellow solution results. This solution is cooled to about 50°C and dripped warm into an aqueous solution of sodium acetate in an ice bath. The resulting slurry is filtered and washed with dilute aqueous acetic acid (pH3). After drying in vacuo, 11.5 g of a fine white powder is recovered, which upon NMR analysis is shown to be the following polymeric sulfanilamide

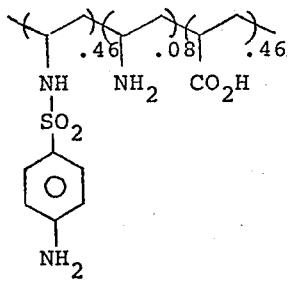

C. 2.975 Grams of the polysulfanilamide product of Part B is dissolved in 45 ml of 10% hydrochloric acid and 200 ml of water with stirring. 1.0 N aqueous sodium nitrite solution (11.0 ml) is added to give a dark yellow solution, which is then dripped gradually into a solution of 2.46 g of Schaeffer's salt in 67 ml of 10% aqueous sodium hydroxide and 90 ml of water, while stirring in an ice bath. The resulting deep red solution is stirred in the ice bath for 30 minutes, treated with 10% aqueous hydrochloric acid to a pH of 2 to yield an orange suspension which is centrifuged. The separated solids are purified by dialysis to yield 4.4 g of an intense orange dye having a color almost indistinguishable from that of Sunset Yellow (FD&C Yellow No. 6). Analysis showed that this dye has the following structure

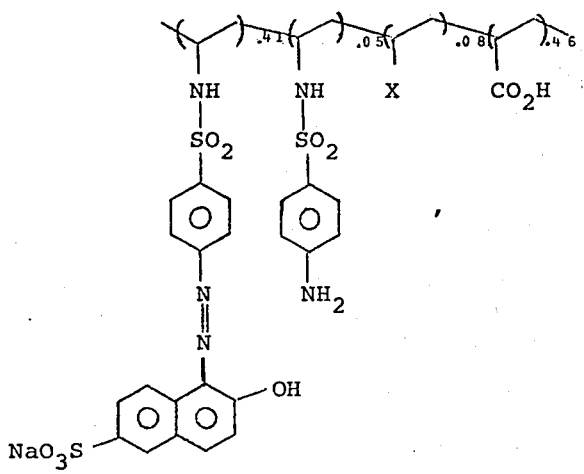

wherein X is NH₂ and OH. This material contains 0.25 parts of nonchromophore for each part by weight of chromophore.

D. A 10 mg portion of the polymeric dye of part C is dissolved in 100 ml of distilled water. A rich orange color develops. This solution contains 100 ppm weight of polymeric dye, which is equivalent in this case to about 80 ppm weight of chromophore. A 100 ppm weight solution is prepared of the corresponding monomeric dye, Sunset Yellow,

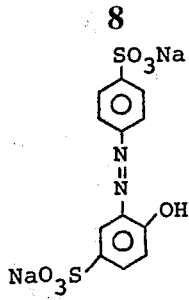

A visual comparison of the two solutions shows that the polymeric dye solution is distinctly darker in shade. The polymeric dye solution is gradually diluted until a visual color match is achieved, which occurs at a polymeric dye contentration of 45–50 ppm. The two matched solutions are then parallelly diluted in half and in half again. It is observed that the color match continues at these greater dilutions as well.

EXAMPLE II

The dye comparisons of Example I are repeated using a variety of different substrates:

1. A transparent colorless soft drink base,
2. A gelatin solution which is later set, and
3. A cloudy soft drink base.

In all cases the color intensity effect noted in part C of Example I is observed.

EXAMPLE III

The preparation of polysulfanilamide in accord with parts A and B of Example I is repeated, the product differing from the product of Example I only in insignificant variations in molar ratios.

1.0 Grams of the above product is dissolved in 10 ml of 10% aqueous hydrochloric acid and 40 ml of water to yield a clear yellow solution. This solution is stirred at room temperature while 2.48 ml of a 1.0 N aqueous sodium nitrite solution is added. This solution is then added over a period of 5 minutes to a solution of 738 ml of Pyrazolone T,

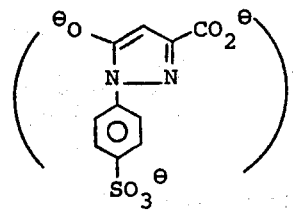

in 15 ml of 10% aqueous sodium hydroxide and 20 ml of water while stirring in an ice bath. A deep red solution results. This solution is acidified with 10% hydrochloric acid. At pH 2 a yellow-orange precipitate forms, which is separated and purified by dialysis. This product is dried and upon analysis found to be the following polymeric coloring:

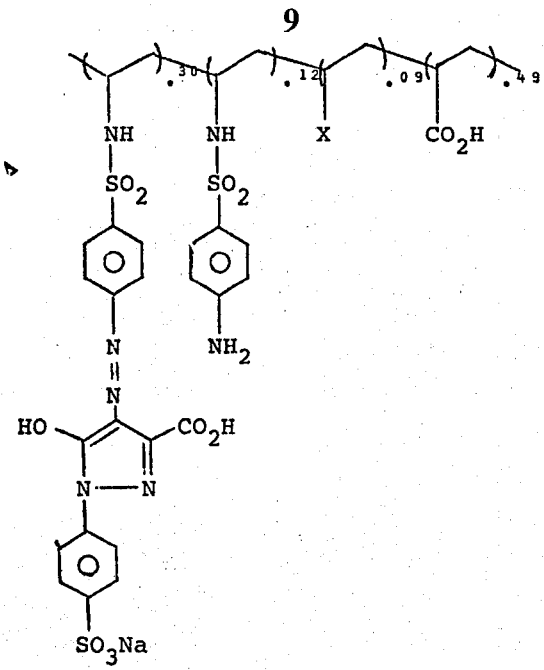

(wherein X is NH₂ or OH) which contains by weight about 2.3 parts of chromophore for each part of non-chromophore.

This coloring is virtually indistinguishable in color from Tartrazine — FD&C Yellow No. 5,

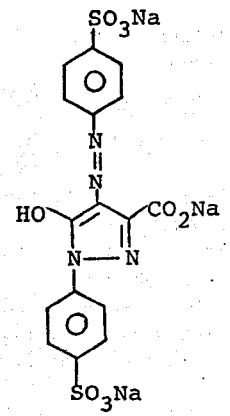

When 100 ppm weight solutions of the polymeric color and Tartrazine are prepared, the polymeric material's solution is darker. When the polymeric solution is diluted to about 60 ppm it becomes a visual color match for the monomeric material solution.

I claim:

1. A colored edible product comprising a translucent edible substrate having dissolved therein polymeric dye in a weight sufficient to yield a desired shade, said polymeric dye having a molecular weight of from about 2000 to 400,000 and consisting of one part by weight of chromophoric groups represented by Ch joined together by from 0.1 to 2 parts by weight of nonchromophoric linking groups represented by B into a structure represented by a structural formula selected from $+Ch\ B\ +_n$ and $$-\underset{(Ch)_n}{\overset{|}{\underset{|}{B}}}-,$$

wherein $n$ is an integer greater than 1, said weight of polymeric dye being from about 0.4 to 0.9 times the weight of monomeric chromophoric groups Ch necessary to yield said desired shade.

2. The product of claim 1, wherein said substrate is three-dimensional.

3. The product of claim 2, wherein said substrate is selected from the group consisting of liquids solids and gels.

4. The product of claim 3, wherein said substrate is a liquid.

5. The product of claim 3, wherein said substrate is a gel.

6. The process for coloring a translucent edible substrate to a desired shade which comprises dissolving in said edible substrate a weight of polymeric dye; said polymeric dye consisting of one part by weight chromphoric groups respresented by Ch, joined together by from 0.1 to 2 parts by weight of nonchromophoric linking groups represented by —B— into a polymer represented by a structural formula selected from $+CH\ B\ +_n$ and $$\cdot-\underset{(Ch)_n}{\overset{|}{\underset{|}{B}}}-,$$

wherein $n$ is an integer greater than 1, said weight of polymeric dye being from about 0.4 to 0.9 times the weight of monomeric chromophoric groups necessary to achieve said desired shade.

7. The process of claim 6 wherein said substrate is three dimensional.

* * * * *